May 9, 1939.   H. P. BEMIS   2,157,093
METHOD OF MAKING A FLEXIBLE COUPLING
Filed June 21, 1935
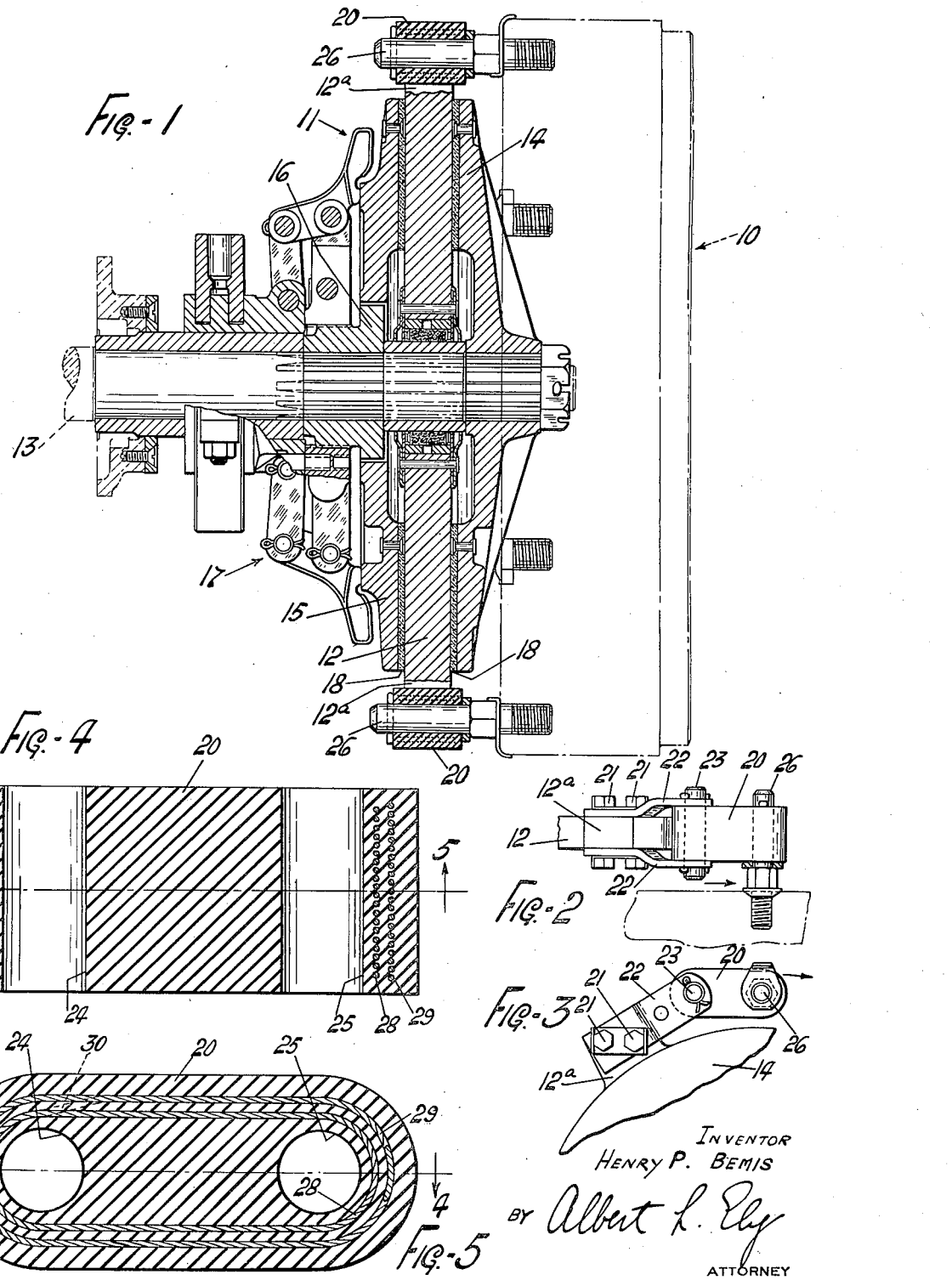

Patented May 9, 1939

2,157,093

UNITED STATES PATENT OFFICE 2,157,093

METHOD OF MAKING A FLEXIBLE COUPLING

Henry P. Bemis, Newton Center, Mass., assignor to The Firestone Tire & Rubber Company, Akron, Ohio, a corporation of Ohio Application June 21, 1935, Serial No. 27,752

2 Claims. (Cl. 154—2)

This invention relates to flexible couplings, and more especially it relates to flexible couplings for use between a driving member, such as the flywheel of a motor vehicle, and a driven member such as the clutch of said vehicle.

Coupling members of the character mentioned heretofore have been laminated structures consisting of a plurality of leather plies, and have been found not entirely satisfactory due to stretching of the leather resulting in back-lash or lost motion in the coupling.

The chief objects of this invention are to provide a superior coupling link of the character mentioned; and to avoid back-lash or lost motion in the coupling between a vehicle clutch and its driving member. More specifically the invention aims to provide a flexible coupling for use between a clutch and flywheel, which coupling is not subject to permanent elongation.

Of the accompanying drawing:

Figure 1 is a diametric section through a motor vehicle clutch of known design and the improved couplings connecting said clutch to a flywheel, the latter being indicated in broken lines;

Figure 2 is a fragmentary edge view of the structure shown in Figure 1, showing the improved coupling in plan;

Figure 3 is a side elevation of the structure shown in Figure 2, from the near side thereof;

Figure 4 is a section, on a larger scale, of an improved coupling taken on the line 4—4 of Figure 5; and Figure 5 is a section on the line 5—5 of Figure 4.

Referring to the drawing, 10 indicates generally the flywheel of a motor vehicle, and 11 indicates generally a clutch of known design that comprises a driving plate 12 that is journaled upon a driven shaft 13, a driven plate 14 splined to shaft 13 on one side of plate 12, a driven plate 15 on the opposite side of the latter mounted for axial movement upon a collar 16 that is splined to shaft 13, and mechanism indicated generally at 17 for urging said driving and driven plates together. Clutch facings 18, 18 on the adjacent faces of driven plates 14, 15 provide the requisite friction for transmitting power from the driving plate 12 to said driven plates.

Power is transmitted from the flywheel 10 to the driving clutch plate 12 through the agency of a plurality of the improved flexible couplings 20, 20 of which six are used in the construction shown. To this end the driving clutch plate 12 is formed with six lugs 12a, 12a, that project radially from its outer periphery, and secured to each of said lugs by bolts 21, 21 are front and rear shackles 22, 22 that are disposed substantially tangentially of said clutch plate. At their free ends each pair of shackles 22 is pivotally connected to a pin 23 that extends through an aperture 24 formed in one end of a coupling member 20. A similar aperture 25 is formed in the opposite end of each coupling member 20 and receives a stud or spindle 26 that is threaded into the adjacent lateral face of the flywheel 12 and projects therefrom toward the clutch. The flywheel is driven by a motor (not shown) in the direction indicated by the arrows in Figures 2 and 3 whereby the coupling members 20 are subjected to tension in use.

Referring now to Figures 4 and 5, it will be seen that each coupling member 20 is composed of a block of vulcanized rubber composition, which composition preferably is tough and heat resisting. The coupling is reinforced by two layers 28, 29 of cable cord that extend longitudinally of the coupling and concentrically about the apertures 24, 25 at the respective ends thereof, said layers being parallel to each other and to the plane of said apertures in their reaches between the latter. Preferably there is a layer of rubber between the apertures 24, 25 and the inner layer of cords 28, and a layer of rubber between the two layers of cords. The layers of cord 28, 29 are composed of a single strand of inextensible, pre-stretched cable cord that is disposed in a succession of adjacent convolutions in each layer, which layers are locally connected as indicated at 30, Figure 5.

The construction of the couplings 20 is such that there is a modicum of resilience therein which somewhat cushions the normal jolt present when the clutch is initially closed. The cord reinforcing plies serve to relieve the rubber of tensional strains and substantially all compressive strains during use, and the elasticity of the rubber in the structures serves to restore them to normal condition when operating strain is removed. Because of the pre-stretched condition of the cords, they do not become permanently elongated and back-lash in the assembly is obviated.

Modification may be resorted to without departing from the spirit of the invention or the scope of the appended claims.

What is claimed is:

1. The method of making flexible coupling links which comprises removing the stretch from a length of cable cord, winding the said cord about a block of unvulcanized rubber composition in a succession of adjacent convolutions, applying a covering layer of unvulcanized rubber over the said convolutions, and then vulcanizing the assembled structure.

2. The method of making flexible coupling links which comprises removing the stretch from a length of cable cord, winding a block of unvulcanized rubber composition from one side to the other with said cable cord laid in a succession of parallel, adjacent convolutions, covering said convolutions with a layer of unvulcanized rubber composition, renewing the winding with the unsevered cord toward the opposite side of the structure until a second layer of cords is disposed thereon, covering said second layer of cords with a layer of unvulcanized rubber composition, and then vulcanizing the assembled structure.

HENRY P. BEMIS.